(12) United States Patent
    Guard

(10) Patent No.: US 8,723,818 B2
(45) Date of Patent: May 13, 2014

(54) TOUCH SCREEN POLY LAYER ELECTRODE DISTRIBUTION

(75) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 868 days.

(21) Appl. No.: 12/879,693

(22) Filed: Sep. 10, 2010

(65) Prior Publication Data

US 2012/0062469 A1    Mar. 15, 2012

(51) Int. Cl.
    *G06F 3/041*    (2006.01)
(52) U.S. Cl.
    USPC .......................................... 345/173
(58) Field of Classification Search
    USPC .................................. 345/173–178
    See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2006/0032680 | A1* | 2/2006 | Elias et al. ............... 178/18.06 |
| 2008/0158183 | A1* | 7/2008 | Hotelling et al. ............ 345/173 |
| 2009/0315854 | A1 | 12/2009 | Matsuo |
| 2010/0123681 | A1* | 5/2010 | Wu et al. ................... 345/174 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076612 | A1 | 3/2013 | Myers |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
News, New Silver Conductive Inks Target High-Growth Touch Screen and OLED Markets, DuPont Microcircuit Materials Expands Innovative Offerings for Printed Electronics, Research Triangle Park, N.C., Apr. 13, 2010, Printed from website: http://www2dupont.com/MCM/en_US/news_events/article20100413.html on Apr. 20, 2010.
Cambrios Technologies Corporation Awarded Department of Defense Contract for Flexible Solar Cells, Sunnyvale, CA, Apr. 12, 2010, Cambrios Technologies Corp., Printed from website: http://www.cambrios.com/200/DOD_Release.htm on Apr. 20, 2010.
Horteis et al., "Fine Line Printed and Plated Contacts on High Ohmic Emitters Enabling 20% Cell Efficiency," Fraunhofer Institute for Solar Energy Systems, IEEE (2009).
Core Applications & Technologies, Printing of Antennas and Flexible Circuits, Conductive InkJet Technology Ltd. (2009).
Latest News, Conductive InkJet Technology, Printed from Website: http://www.conductiveinkjet.com/about-us/latest-news/2009.aspx on Apr. 20, 2010.
U.S. Appl. No. 12/606,934, filed Oct. 27, 2009, Harald Philipp.

* cited by examiner

*Primary Examiner* — Dwayne Bost
*Assistant Examiner* — Christopher Kohlman
(74) *Attorney, Agent, or Firm* — Baker Botts LLP

(57) ABSTRACT

A touch screen position sensor has two sets of electrodes, where at least one of the electrodes is divided into segments that are arranged on opposing faces of a substrate. The electrode segments on one face of a substrate do not overlap with the electrode segments on the opposing face of the substrate.

20 Claims, 8 Drawing Sheets

TOUCH SCREEN POLY LAYER ELECTRODE DISTRIBUTION

BACKGROUND

A touch screen position sensor can detect the presence and location of a touch, by a finger or an object, such as a stylus, within a display area of the position sensor overlaid on a display screen. In a touch sensitive display application, the position sensor enables a user to interact directly with what is displayed on the screen, rather than indirectly with a mouse or touchpad. Position sensors can be attached to or provided as part of computers, personal digital assistants, satellite navigation devices, mobile telephones, portable media players, portable game consoles, public information kiosks, point of sale systems, etc. Position sensors have also been used as control panels on various appliances.

There are a number of different types of position sensors/touch screens, such as resistive touch screens, surface acoustic wave touch screens, capacitive touch screens, etc. A capacitive touch screen may include an insulator coated with a transparent conductor in a particular pattern. When a finger or object touches or is provided in close proximity to the surface of the screen, there is a change in capacitance. This change in capacitance is sent to a controller for processing to determine the position of the touch on the screen.

In recent years, the drive and/or sense electrodes of the touch screen have been interpolated in order to increase the resolution of larger screens. For example, the density of the electrodes or electrode segments may increase, decrease, or vary in one or more directions over the surface of the substrate. This interpolation allows for detection of a finger or other object according to the number of electrodes or electrode segments that sense the finger or object. However, the drive and/or sense electrode patterns which can be used have been constrained because adjacent electrodes are electrically isolated from one another.

SUMMARY

The following disclosure describes a touch screen position sensor having two sets of electrodes. At least one of the electrodes is divided into segments that are arranged on opposing faces of a substrate. The electrode segments on one face of a substrate do not overlap with the electrode segments on the opposing face of the substrate.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

In the examples, two sets of electrodes for touch sensing are provided on two substrates electrically separated by a dielectric layer. For at least one set of the electrodes, some electrodes or electrode segments are provided on one face of the respective substrate and others are provided on an opposite face of the respective substrate.

Reference now is made in detail to the examples illustrated in the accompanying figures and discussed below. Although applicable for other forms of touch sensing, the examples are related to mutual capacitance type touch sensing, in which the two sets of electrodes may serve as drive and sense electrodes. In some examples, the drive electrodes or electrode segments are denoted with an "X" in the following figures and the sense electrodes or electrode segments are denoted with a "Y". In other examples, the Y electrodes may be drive electrodes or electrode segments and the X electrodes may be sense electrodes or electrode segments. However, throughout this description the convention of X as drive electrodes or electrode segments and Y as sense electrode or electrode segments will be used to simplify discussion.

Figure 1:
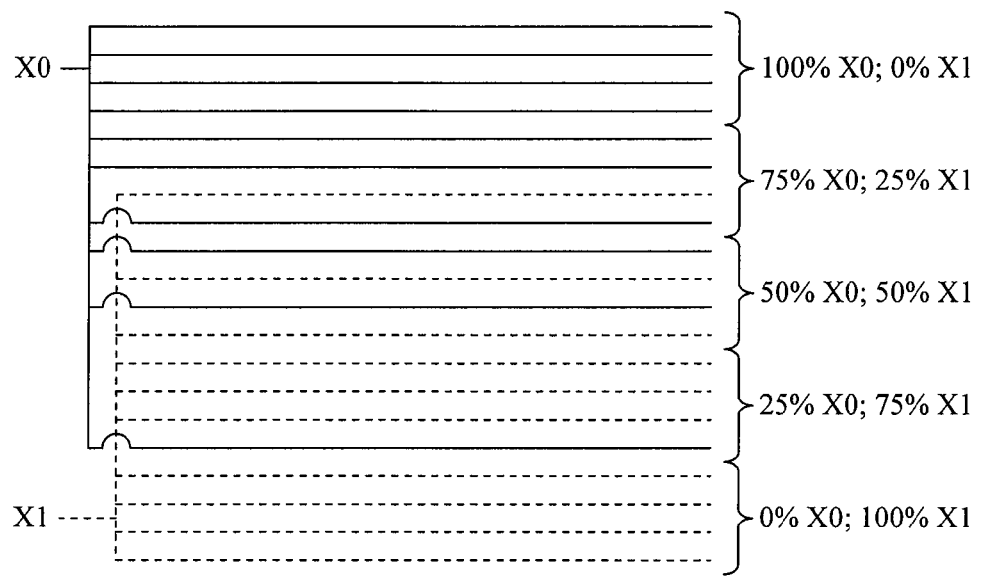
FIG. 1 illustrates a simplified plan view of interpolated drive electrodes for a touch screen.

FIG. 1 illustrates a simplified plan view of interpolated drive electrodes for a touch screen. In FIG. 1, two drive electrode sets X0 and X1 are configured with varying distributions to effect varying field intensities which can be interpreted, by circuitry described below, in order to determine the position of a touch on a touch screen. The X0 and X1 electrodes can be considered to be arranged into sub-groups having varying distributions of X0 and X1 electrode segments. For example, at the top of FIG. 1 there is provided, in descending order, four X0 electrode segments and zero X1 electrode segments, making this sub-group 100% X0; three X0 electrode segments and one X1 electrode segment, making this sub-group 75% X0 and 25% X1; two X0 electrode segments and two X1 electrode segments, making this sub-group 50% X0 and 50% X1; one X0 electrode segment and three X1 electrode segments, making this sub-group 25% X0 and 75% X1; and zero X0 electrode segments and four X1 electrode segments, making this sub-group 100% X1. This arrangement of electrode segments within each electrode group facilitates a smooth, linear gradient for the purposes of touch sensing.

Figure 2:
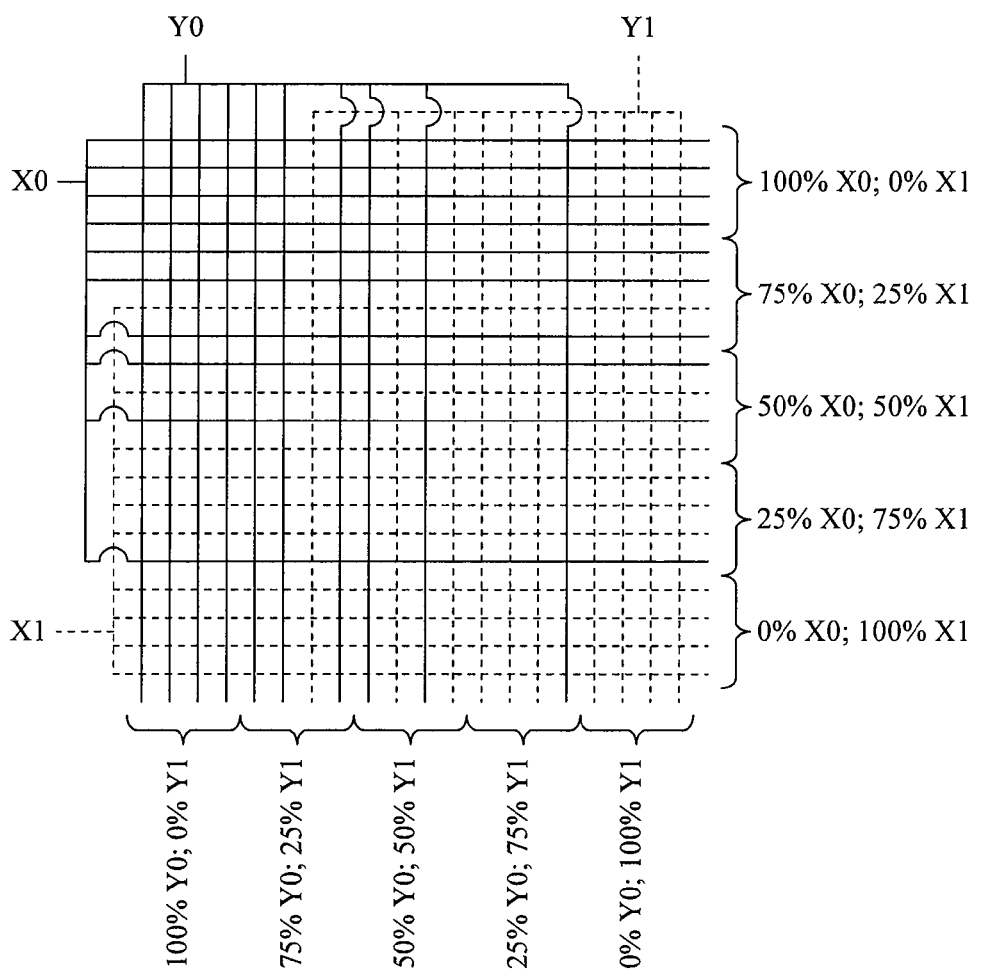
FIG. 2 illustrates a simplified plan view of interpolated drive and sense electrodes for a touch screen.

FIG. 2 illustrates a simplified plan view of interpolated drive (X) electrodes and interpolated sense (Y) electrodes for a touch screen. As with FIG. 1 two drive electrode sets X0 and X1 are provided. In addition, the touch screen has two sense electrode sets Y0 and Y1. However, any number of interpolated drive and sense electrodes may be provided.

Nodes are formed where the drive electrode segments and the sense electrode segments overlap. The drive and sense electrodes can be configured to form any particular pattern of electrode segments as desired, and are not limited to the arrangements illustrated herein.

Figure 3:
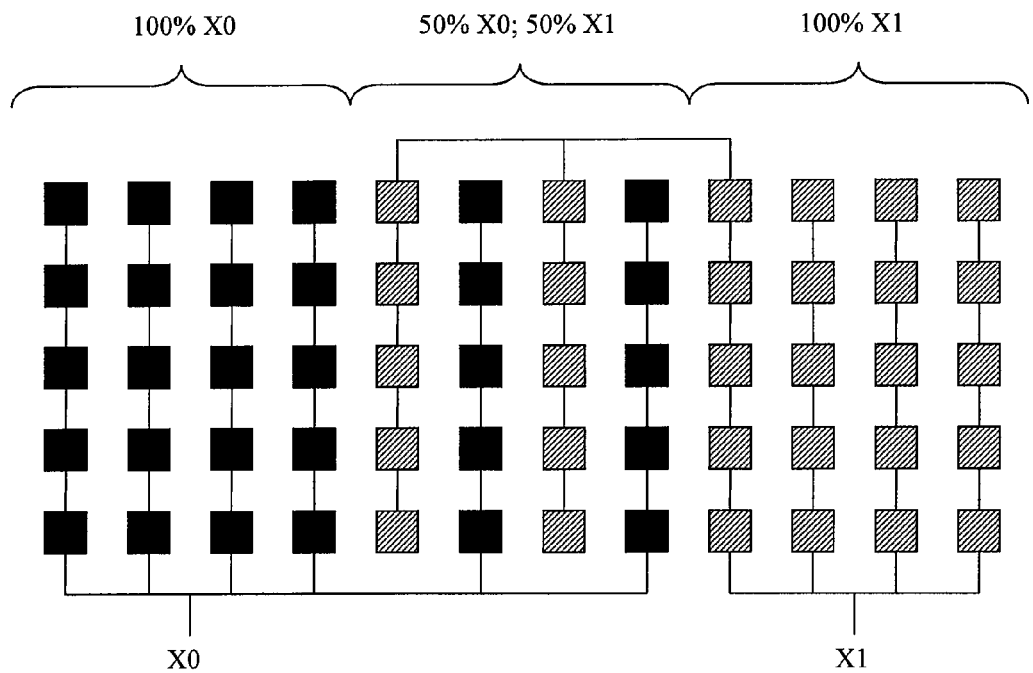
FIG. 3 illustrates a plan view of an interpolated drive electrode pattern for a touch screen.
Figure 4:
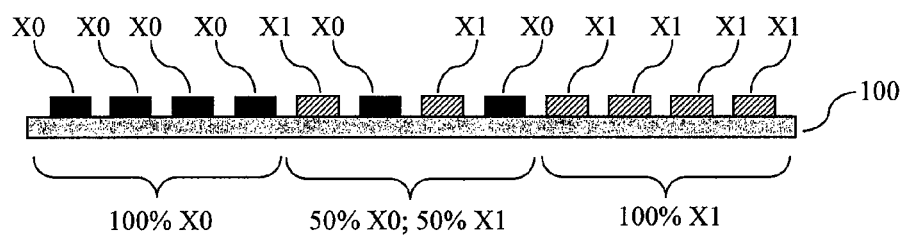
FIG. 4 illustrates a cross sectional view of the electrode pattern of FIG. 3.

The evenness of the distribution of electrical fields between two adjacent electrode segments is a function of the physical geometric shape, size and distribution pattern of each electrode. FIGS. 3 and 4 illustrate an interpolated X electrode pattern for use in a two layer touch screen having one substrate. For simplification, the Y electrodes are not illustrated in FIGS. 3 and 4. The electrode pattern of FIGS. 3 and 4 provides electrical isolation between adjacent electrode segments and is substantially imperceptible to the human eye, due to the uniformity of the pattern, when a touch screen having the electrode pattern of FIGS. 3 and 4 is provided over a display. In some examples, the patterns may not be solid, as the total metal density is low to allow for light to pass through. In other examples, the shape and repetitions of the patterns may be designed to avoid repetitive interference when placed over a display made of pixels.

As can be seen from FIG. 3, the elements of each electrode segment in the interpolated area are grouped together for ease of connectivity and minimal tracking. The electrodes X0, X1 are formed on a substrate 100, such as polyethylene terephthalate (PET), polycarbonate, or glass.

Figure 5:
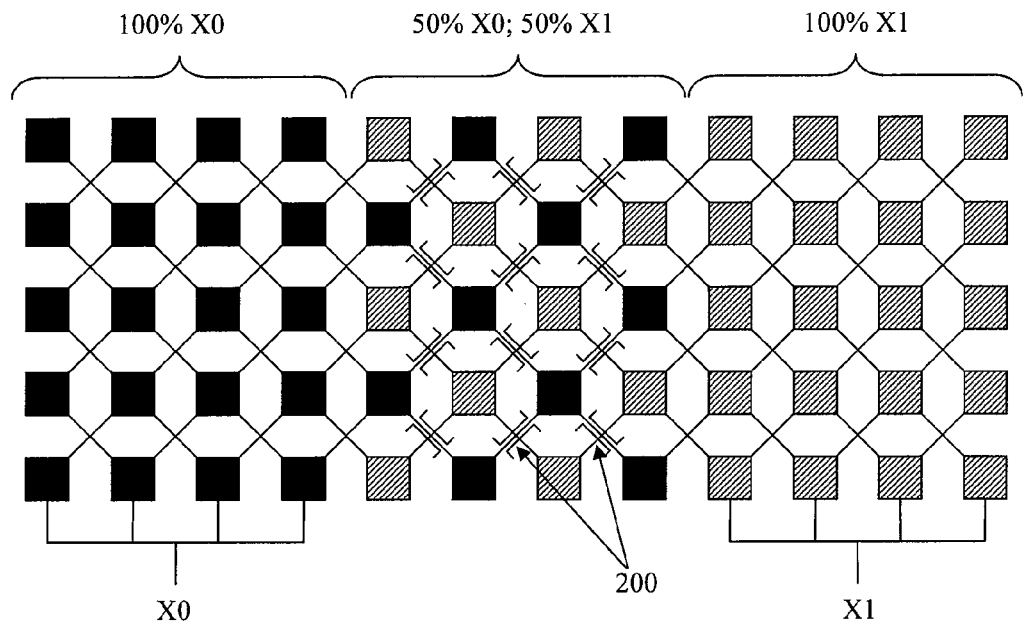
FIG. 5 illustrates a plan view of an interpolated drive electrode pattern with consistent patterning for a touch screen.

FIG. 5 illustrates another interpolated X electrode pattern provided on a single face of a substrate. For simplification, the Y electrodes are not illustrated in FIG. 5. In FIG. 5, the electrode pattern has been modified as compared to the electrode pattern of FIG. 3 to provide a more even distribution of electrical field, by evenly distributing the electrode segments between X0 and X1 in the interpolated region. Electrical redundancy and conductivity has been improved as compared to the arrangement of FIGS. 3 and 4 by increasing the number of interconnections between each electrode segment. However, as can be seen from the FIG. 5, in order to maintain redundancy and still achieve adjacent electrical isolation in the interpolated area, crossovers 200 are used. Crossover 200 may be a dielectric layer which is provided between the X0 and X1 electrode segment at points where they overlap. The use of crossovers tends to increase manufacturing costs and reduce reliability and optical clarity of the resulting screen.

Figure 6:
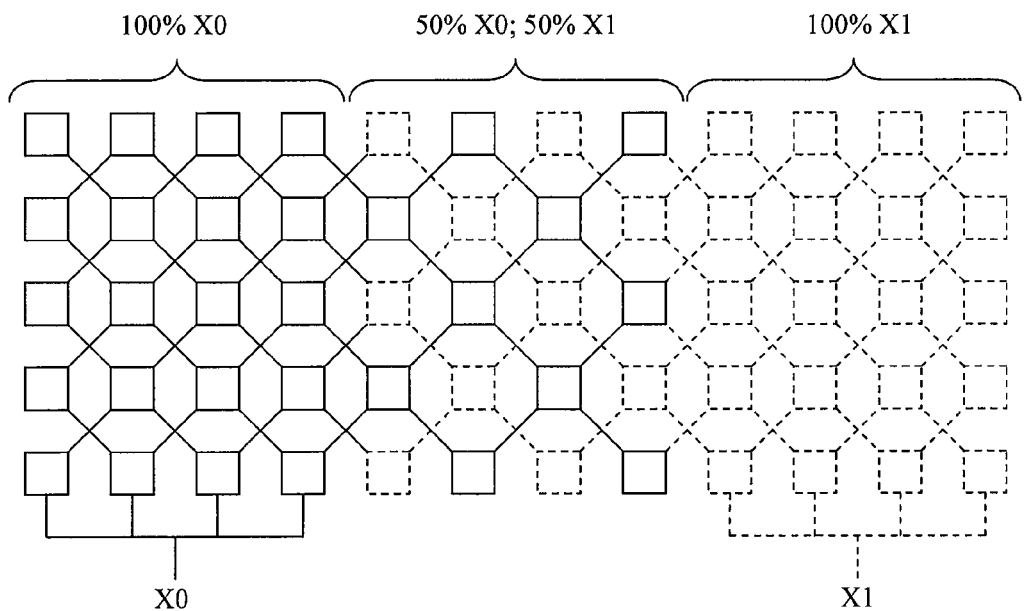
FIG. 6 illustrates a plan view of a dual faced drive electrode pattern for a touch screen.
Figure 7:
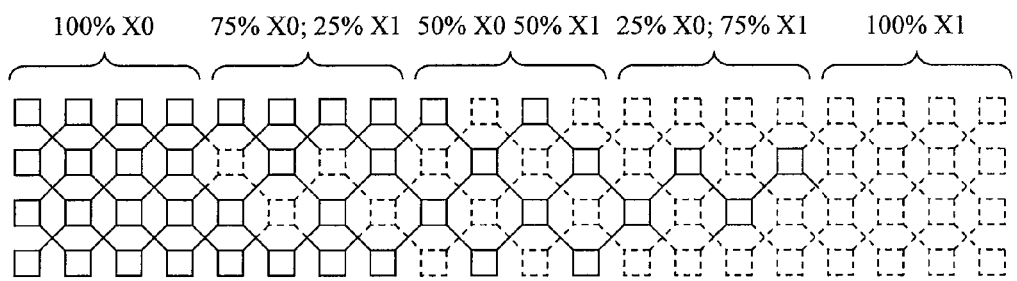
FIG. 7 illustrates a plan view of five levels of interpolation for a dual faced touch screen.

FIGS. 6 and 7 illustrate a plan view of a dual faced drive electrode pattern for a touch screen. FIG. 6 illustrates three levels of interpolation for a touch screen. FIG. 7 illustrates five levels of interpolation for a touch screen. In the arrangement illustrated in FIGS. 6 and 7, X electrode segments X0, X1 are located on either face of a single substrate. As can be seen in these examples, the electrode segments X0 do not overlap with the electrode segments X1. Rather, the electrode segments X0 and X1 are not aligned.

In the arrangement of FIGS. 6 and 7, the electrode pattern is not restricted by continuity constraints and tracking to the connector is available on both faces of the substrate such that the border area around the screen can be reduced. This feature enables, for example, a screen bezel to be made much thinner. Although not illustrated in FIGS. 6 and 7, interpolation of the Y electrodes may be achieved in a similar manner such that adjacent Y electrode segments are provided on either face of a single substrate.

Figure 8:
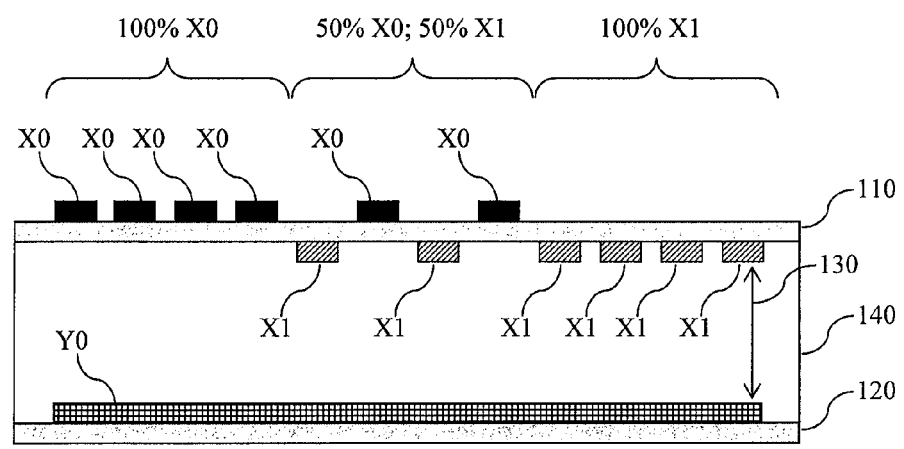
FIG. 8 illustrates a cross sectional view of a dual faced drive electrode pattern and a single faced sense electrode pattern for a touch screen.

Consequently, a touch screen is provided having X and/or Y electrode segments positioned on either face of their respective substrates. Although separated by the substrate, lateral positions of electrodes may be interpolated much like in the examples of FIGS. 1-5. FIG. 8 illustrates a cross sectional view of a touch screen having a dual faced X electrode pattern. The substrate 110 may be relatively thin when compared with a thickness 130 of the dielectric layer 140 separating the X and Y electrodes and a thickness of the front touch panel provided over the Y electrodes. This may allow for variations in electrical field coupling between X and Y electrode segments to be minimized. As can be seen from FIG. 8, X electrode segments X0, X1 are positioned on opposite faces of their respective substrate 110. The electrode segments X0 and X1 may be interpolated in a manner similar to the example of FIGS. 2 and 3.

In addition, although not illustrated in the example of FIG. 8, Y electrode segments Y0 are positioned on opposite faces of their respective substrate 120.

In one example, the substrates 110, 120 are PET, polycarbonate, or glass. The substrates 110, 120 are separated by a dielectric material 140. A dielectric separation distance 130 is provided between the X1 electrodes and the Y electrode. For simplicity, only one Y electrode, Y0, is illustrated in FIG. 8.

Figure 9:
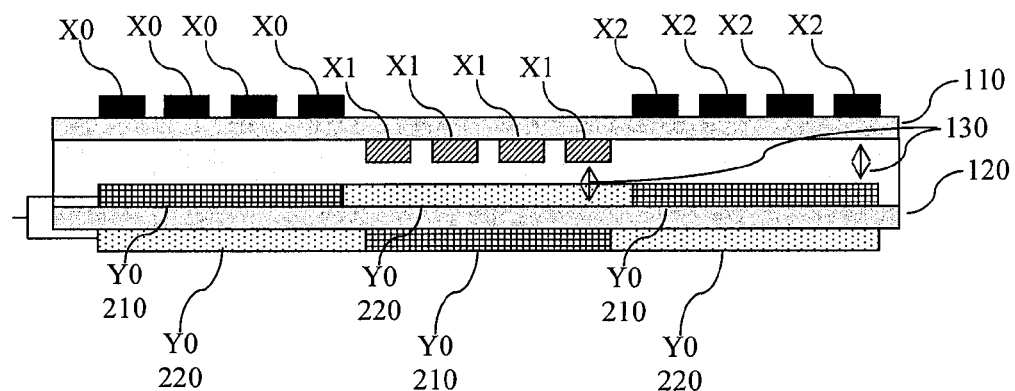
FIG. 9 illustrates the cross sectional view of a non-interpolated dual faced drive electrode pattern and a non-interpolated dual faced sense electrode for a touch screen.

FIG. 9 illustrates a cross sectional view of a non-interpolated drive electrode pattern for a touch screen. In FIG. 9, in order to minimize variations in electrical field and to optimize electrical field intensity between X electrodes X0, X1, X2 on alternate faces of a first substrate 110 and Y electrodes Y0 on a second substrate 120, the distance 130 between the X and Y electrodes is substantially shorter when compared to the distance 130 between the X and Y electrodes illustrated in FIG. 8.

In FIG. 9, electrode segments X1 are provided on the lower face of the first substrate 110, closer to the second substrate 120, and the electrode segments X0 and X2 are provided on the upper face of the first substrate 110 farther from the second substrate 120. The Y0 electrode is provided on both faces of the second substrate 120. The Y0 electrode is broken into consecutive segments of high density and low density electrode patterns, relative to the X electrodes, coincident with the transversely intersecting X electrode segments above them. For example, when the X electrode segment is provided on the upper face of the first substrate 110, such as electrodes X0 and X2, the Y0 electrode segment 210 having a high pattern density is provided on the upper face of the second substrate 120 and the Y0 electrode segment 220 having a low pattern density is provided on the lower face of the second substrate 120. In addition, when the X electrode segment is provided on the lower face of the first substrate 110, such as electrode segment X1, the Y0 electrode segment 220 having a low pattern density is provided on the upper face of the second substrate 120 and the Y0 electrode segment 210 having a high pattern density is provided on the lower face of the second substrate 120. This topology allows the dielectric separation 130 between adjacent X electrode segments and the section of the corresponding Y0 electrode segments with which the X electrode segments intersect to be similar, and may result in a uniform electrical field distribution and capacitive coupling throughout the panel.

In another example, by placing the portion of the Y electrode segment intersected by a given X electrode segment, synchronously or coincident on the same face of their respective substrate, it is possible to further decrease any variation in electrical field distribution between the X and Y electrodes.

Figure 10:
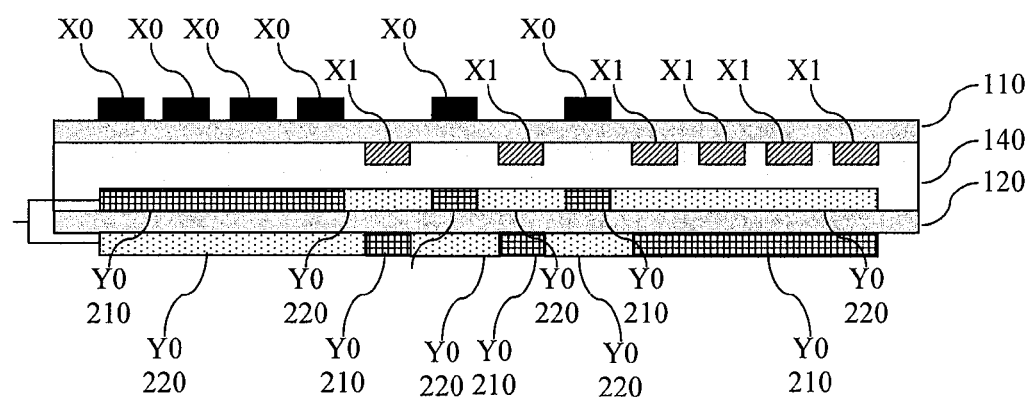
FIG. 10 illustrates a cross sectional view of a dual faced interpolated drive electrode pattern and an interpolated dual faced sense electrode pattern for a touch screen.

FIG. 10 illustrates a cross sectional view of a dual faced X interpolated drive electrode pattern and dual faced Y interpolated sense electrode pattern for a touch screen. As illustrated in FIG. 10, when the X electrode segment is provided on the upper face of the first substrate 110 such as electrode segments X0, the Y0 electrode segment 210 having a high pattern density may be provided on the upper face of the second substrate 120 and the Y0 electrode segment 220 having a low pattern density may be provided on the lower face of the second substrate 120. In addition, when the X electrode segment is provided on the lower face of the first substrate 110, such as electrode segment X1, the Y0 electrode segment 220 having a low pattern density may be provided on the upper face of the second substrate 120 and the Y0 electrode segment 210 having a high pattern density may be provided on the lower face of the second substrate 120.

Figure 11:
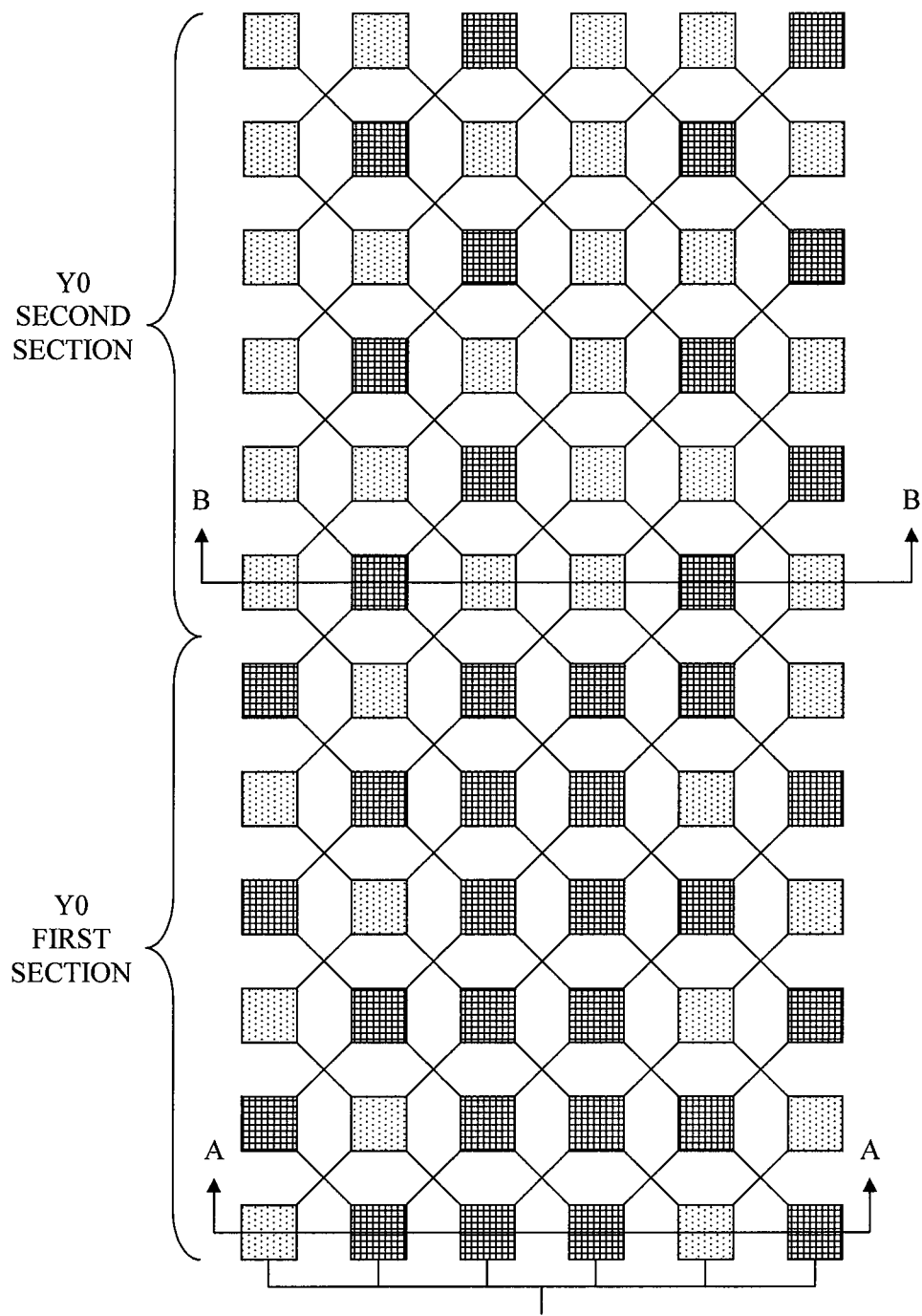
FIG. 11 illustrates a plan view of a dual faced sense electrode pattern for a touch screen.

FIG. 11 illustrates a plan view of a dual faced sense electrode pattern for a touch screen. In one example, the dual faced sense electrode pattern of FIG. 11 may be the electrode pattern used in FIG. 9. In one example, to create the high density area 210 and the low density area 220 of the Y electrode segments, the thickness of the Y electrodes may not be altered. Instead the area over which the Y electrode material is provided on either face of the substrate 120 may be varied.

However, the combined coverage area provided on both faces of the substrate 120 may be maintained. For example, in FIG. 11, the first section of the Y0 electrode is provided with ⅔, which is a majority of Y0 electrode segments on the upper surface of the substrate 120 and ⅓, which is a minority of Y0 electrode segments on the lower surface of the substrate 120. In addition, the second section of the Y0 electrode is provided with ⅓, which is a minority of the Y0 electrode segments on the upper surface of the substrate 120 and ⅔, which is a majority of the Y0 electrode segments on the lower surface of the substrate 120. Therefore, the total area of coverage of the Y0 electrode may be similar in both the first section and the second section. For simplicity, the substrate 120 is not illustrated in FIG. 11.

Figure 12A:
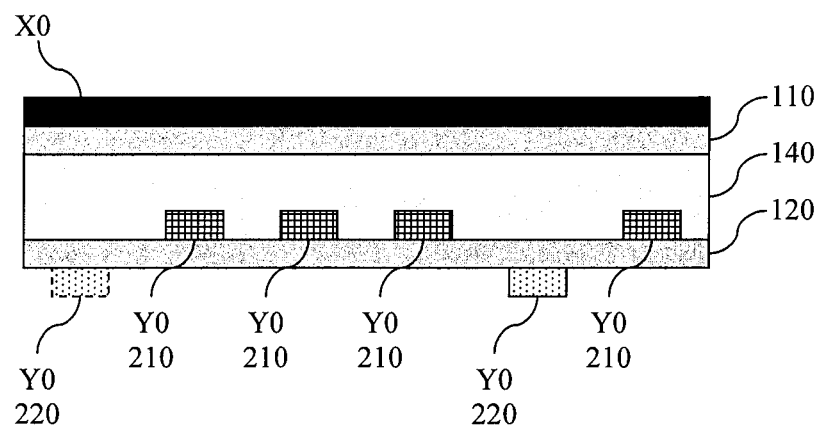
FIG. 12A illustrates a cross sectional view of a dual faced sense electrode pattern and dual faced drive electrode pattern for a touch screen taken along line A-A of FIG. 11.
Figure 12B:
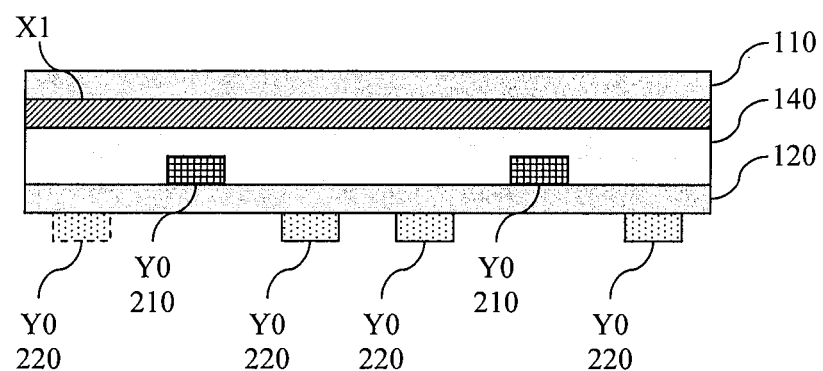
FIG. 12B illustrates a cross sectional view of a dual faced sense electrode pattern and dual faced drive electrode pattern for a touch screen taken along line B-B of FIG. 11.

FIG. 12A illustrates a cross sectional view of a dual faced sense electrode pattern and dual faced drive electrode pattern for a touch screen taken along line A-A of FIG. 11. FIG. 12B illustrates a cross sectional view of a dual faced sense electrode pattern and dual faced drive electrode pattern for a touch screen taken along line B-B of FIG. 11.

As can be seen in FIG. 12A, in the first section, a majority of Y electrode segments 210 is arranged on the upper surface of the substrate 120. A minority of Y electrode segments 220 is arranged on the lower surface of the substrate 120. In the second section shown in FIG. 12B, a minority of Y electrode segments 210 is arranged on the upper surface of the substrate 120, and a majority of Y electrode segments 220 is arranged on the lower surface of the substrate 120. In these examples, the upper surface is closer to the top of the page and the lower surface is closer to the bottom of the page opposite the top surface.

In addition, to the layers described with reference to FIGS. 8 to 12, a touch sensitive screen may also comprise a transparent cover panel provided covering the sense electrodes. In one example, the transparent panel may be made of a resilient, transparent material suitable for repeated touching. Examples of the transparent material include glass, polycarbonate or PMMA (poly(methyl methacrylate)). In one example, the drive and sense electrodes may be made of PEDOT (poly(3,4-ethylenedioxythiophene)) or ITO (indium tin oxide). In other examples, drive and/or sense electrodes may be made of conductive mesh, which may be of copper, silver or other conductive materials.

In an application with a display, the touch screens of FIGS. 8 to 12 could be mounted over the exterior of the display device, for example, with the drive electrode adjacent to the display device (not shown). The display may be of any type known to a skilled person, such as a liquid crystal, for example, active matrix liquid crystal, electroluminescent, electrophoretic or e-ink, plasma, or cathode-ray display. Elements of the layer stack may be transparent at least to the degree that light emitted from the display is able to pass through the touch sensitive panel in order to be visible to a user. Light produced or reflected from the display device, representing displayed information, may pass through the elements of the layer stack, for example, downward in FIGS. 8 to 10, for observation of the information by a user. The user may touch the panel, which is usually provided with a transparent cover panel over the sense electrodes, to provide input such as to select from the information shown on the display.

Figure 13:
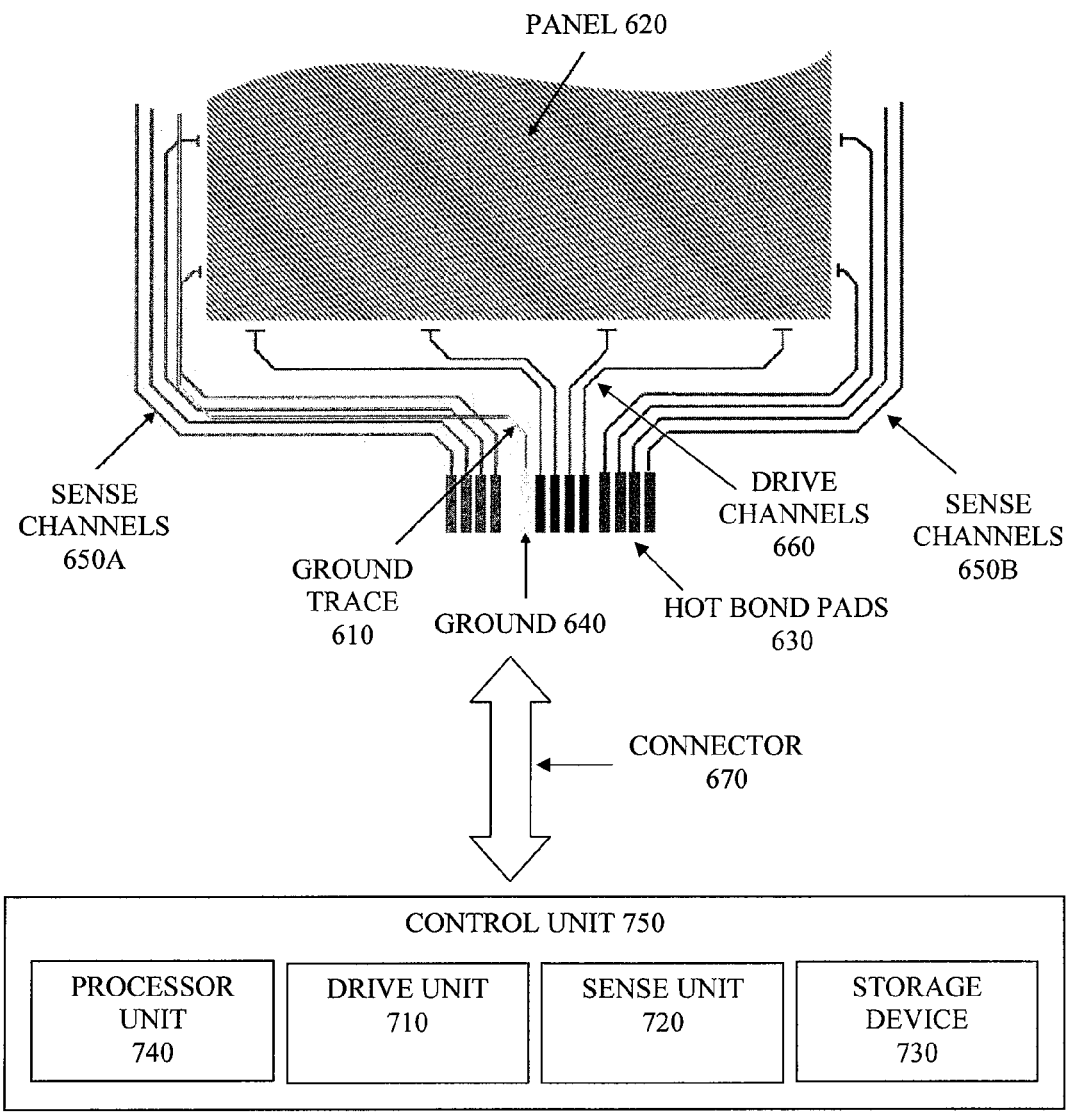
FIG. 13 illustrates schematically an apparatus for detecting and processing a touch at a touch sensitive screen.

A panel of drive and sense electrodes, such as those illustrated in FIGS. 1 to 12, is supported by associated electronics that determine the location of the various touches. FIG. 13 illustrates schematically drive and sense channel connections and the electronics for detecting and processing a touch at a touch sensitive screen 620. In this example, the drive electrodes of the touch screen 620 connect to drive channels 660, and the sense electrodes of the touch screen 620 connect to sense channels 650A, 650B. The sense channels 650A are connected to the sense electrodes provided at the left hand side of the touch screen 620, and the sense channels 650B are connected to the plurality of sense electrodes provided at the right hand side of the touch screen 620. The drive and sense channels 650A, 650B, 660 are connected to a control unit 750 via a connector 670. The wiring traces also include a ground trace 610 having an associated ground connector 640. In the example, the traces forming the channels have hot bond pads 630, to facilitate electrical connection via the connector 670.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

The invention claimed is:
1. A touch sensitive screen comprising:
a first electrode having a plurality of first electrode segments provided on a first substrate, the plurality of first electrode segments being of a first type, the first type comprising either drive electrode segments or sense electrode segments, the first type being the same for the plurality of first electrode segments;
a second electrode having a plurality of second electrode segments provided on a second substrate, wherein a plurality of nodes are formed where the first and second electrode segments overlap, the plurality second electrode segments each being of a second type, the second type being the same for the plurality of second electrode segments and comprising:
  sense electrodes segments if the first type comprises drive electrode segments; or
  drive electrodes segments if the first type comprises sense electrode segments; and
a dielectric layer provided between the first and second substrates, wherein some of the plurality of the first electrode segments are provided on a first face of the first substrate, and the remainder of the plurality of the first electrode segments are provided on a second face of the first substrate opposite the first face, said second face of the first substrate facing the second substrate, and the portion of the first electrode segments provided on the first face of the first substrate are not in alignment with the remainder of first electrode segments provided on the second face of the first substrate.

2. The touch sensitive screen of claim 1, wherein some of the plurality of second electrode segments are provided on a first face of the second substrate, and the remainder of second electrode segments are provided on a second face of the second substrate opposite the first face, said first face of the second electrode facing the first substrate.

3. The touch sensitive screen of claim 2, wherein the first electrode is a drive electrode, and the second electrode is a sense electrode.

4. The touch sensitive screen of claim 2, wherein the first electrode is a sense electrode, and the second electrode is a drive electrode.

5. The touch sensitive screen of claim 1, wherein a density of the first electrode segments provided on the first face of the first substrate increases in a first direction across the substrate, and a density of the first electrode segments provided on the second face of the first substrate decreases in the first direction across the substrate.

6. The touch sensitive screen of claim 5, wherein the density of first electrode segments changes by varying the number of first electrode segments.

7. The touch sensitive screen of claim 5, wherein a density of the first electrode segments provided on the first face of the first substrate increases in a second direction across the substrate, and a density of the first electrode segments provided on the second face of the first substrate decreases in the second direction across the substrate.

8. The touch sensitive screen of claim 1, wherein the first face of the first substrate is divided into a plurality of regions, wherein a density of first electrode segments in one of the plurality of regions is different than a density of first electrode segments in an adjacent region.

9. The touch sensitive screen of claim 8, wherein the number of regions is greater than 2.

10. The touch sensitive screen of claim 8, wherein the number of regions is greater than 4.

11. A touch sensitive screen comprising:
a first electrode having a plurality of first electrode segments provided on a first substrate, the plurality of first electrode segments being of a first type, the first type comprising either drive electrode segments or sense electrode segments, the first type being the same for the plurality of first electrode segments;
a second electrode having a plurality of second electrode segments provided on a second substrate, wherein a plurality of nodes are formed where the first and second electrode segments overlap, the plurality second electrode segments each being of a second type, the second type being the same for the plurality of second electrode segments and comprising:

sense electrodes segments if the first type comprises drive electrode segments; or
drive electrodes segments if the first type comprises sense electrode segments; and
a dielectric layer provided between the first and second substrates,
wherein some of the plurality of the first electrode segments are provided on a first face of the first substrate, and the remainder of the plurality of the first electrode segments are provided on a second face of the first substrate opposite the first face,
the portion of the first electrode segments provided on the first face of the first substrate are not in alignment with the remainder of first electrode segments provided on the second face of the first substrate, and
each of the second electrode segments comprises a high pattern density or a low pattern density.

12. The touch sensitive screen of claim 11, wherein the second substrate is comprised of a first face which faces the first substrate, and a second face opposite the first face,
wherein each of the second electrode segments comprised of high pattern density which are provided on the first face of the second substrate is aligned with a corresponding first electrode segment provided on the first face of the first substrate, and each of the second electrode segments comprised of high pattern density which are provided on the second face of the second substrate is aligned with a corresponding first electrode segment provided on the second face of the first substrate.

13. The touch sensitive screen of claim 11, wherein the first electrode is a drive electrode, and the second electrode is a sense electrode.

14. The touch sensitive screen of claim 11, wherein the first electrode is a sense electrode, and the second electrode is a drive electrode.

15. The touch sensitive screen of claim 11, wherein a density of the first electrode segments provided on the first face of the first substrate increases in a first direction across the substrate, and a density of the first electrode segments provided on the second face of the first substrate decreases in the first direction across the substrate.

16. The touch sensitive screen of claim 15, wherein the density of first electrode segments changes by varying the number of first electrode segments.

17. The touch sensitive screen of claim 15, wherein a density of the first electrode segments provided on the first face of the first substrate increases in a second direction across the substrate, and a density of the first electrode segments provided on the second face of the first substrate decreases in the second direction across the substrate.

18. The touch sensitive screen of claim 11, wherein the first face of the first substrate is divided into a plurality of regions, wherein a density of first electrode segments in one of the plurality of regions is different than a density of first electrode segments in an adjacent region.

19. The touch sensitive screen of claim 18, wherein the number of regions is greater than 2.

20. The touch sensitive screen of claim 18, wherein the number of regions is greater than 4.

* * * * *